(12) United States Patent
Hirata et al.

(10) Patent No.: US 12,528,701 B2
(45) Date of Patent: Jan. 20, 2026

(54) SOLID CARBON PRODUCTION DEVICE AND SOLID CARBON PRODUCTION METHOD

(71) Applicant: MITSUBISHI HEAVY INDUSTRIES, LTD., Tokyo (JP)

(72) Inventors: Takuya Hirata, Tokyo (JP); Kouji Horizoe, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 646 days.

(21) Appl. No.: 17/916,680

(22) PCT Filed: Mar. 29, 2021

(86) PCT No.: PCT/JP2021/013413
§ 371 (c)(1),
(2) Date: Oct. 3, 2022

(87) PCT Pub. No.: WO2021/205935
PCT Pub. Date: Oct. 14, 2021

(65) Prior Publication Data
US 2023/0150820 A1 May 18, 2023

(30) Foreign Application Priority Data

Apr. 6, 2020 (JP) ................................ 2020-068427

(51) Int. Cl.
*C01B 32/05* (2017.01)
*B01J 19/00* (2006.01)
(Continued)

(52) U.S. Cl.
CPC ............ *C01B 32/05* (2017.08); *B01J 19/0013* (2013.01); *B01J 19/245* (2013.01); *C01B 3/24* (2013.01);
(Continued)

(58) Field of Classification Search
CPC .... B01J 19/00; B01J 19/0006; B01J 19/0013; B01J 19/24; B01J 19/245; B01J 2219/00;
(Continued)

(56) References Cited

U.S. PATENT DOCUMENTS

| 4,248,627 A | 2/1981 | Blumenthal et al. |
| 8,926,908 B2 * | 1/2015 | McAlister .............. B01J 19/127 422/198 |

(Continued)

FOREIGN PATENT DOCUMENTS

| CN | 1239121 A | 12/1999 |
| CN | 1600685 A | 3/2005 |

(Continued)

OTHER PUBLICATIONS

Machine Translation, WO 2011/108546 A1, Saima H, Sep. 9, 2011 (Year: 2011).*

(Continued)

*Primary Examiner* — Natasha E Young
(74) *Attorney, Agent, or Firm* — Birch, Stewart, Kolasch & Birch, LLP (57) ABSTRACT

Provided is a solid carbon production facility including: a separation facility configured to separate a carbon dioxide gas contained in a produced gas produced by a blast furnace; a reaction facility configured to heat a fuel gas whose main component is a methane gas by using a heating facility and decompose the methane gas into solid carbon and a hydrogen gas; and a production facility configured to cause the carbon dioxide gas separated by the separation facility and the hydrogen gas decomposed by the reaction facility to react with each other to produce solid carbon and water.

9 Claims, 3 Drawing Sheets

(51) Int. Cl.
*B01J 19/24* (2006.01)
*C01B 3/24* (2006.01)
*C21B 5/00* (2006.01)
*C21B 5/06* (2006.01)
*C21B 7/00* (2006.01)

(52) U.S. Cl.
CPC ............... *C21B 5/007* (2013.01); *C21B 5/06* (2013.01); *C21B 7/002* (2013.01); *B01J 2219/00135* (2013.01); *B01J 2219/00157* (2013.01); *C01B 2203/0272* (2013.01); *C01B 2203/06* (2013.01); *C01B 2203/0811* (2013.01); *C01B 2203/1241* (2013.01); *C21B 2100/282* (2017.05)

(58) Field of Classification Search
CPC .... B01J 2219/00049; B01J 2219/00051; B01J 2219/00132; B01J 2219/00135; B01J 2219/00157; C01B 3/00; C01B 3/02; C01B 3/22; C01B 3/24; C01B 32/00; C01B 32/05; C01B 32/50; C01B 2203/00; C01B 2203/02; C01B 2203/0266; C01B 2203/0272; C01B 2203/06; C01B 2203/08–0811; C01B 2203/081; C01B 2203/12; C01B 2203/1205; C01B 2203/1235; C01B 2203/1241; C21B 5/00; C21B 5/001; C21B 5/007; C21B 5/06; C21B 7/00; C21B 7/002; C21B 2005/005; C21B 2100/00; C21B 2100/20; C21B 2100/22; C21B 2100/28; C21B 2100/282; C21B 2100/60; C21B 2100/64; Y02P 10/00; Y02P 10/10; Y02P 10/122; Y02P 10/143
See application file for complete search history.

(56) References Cited

U.S. PATENT DOCUMENTS

| | | |
|---|---|---|
| 2014/0005283 A1 | 1/2014 | Nakamura et al. |
| 2015/0059527 A1 | 3/2015 | Noyes |
| 2016/0326604 A1 | 11/2016 | Inada et al. |

FOREIGN PATENT DOCUMENTS

| | | | | |
|---|---|---|---|---|
| CN | 103429527 A | | 12/2013 | |
| CN | 105899686 A | | 8/2016 | |
| EP | 0942067 A1 | * | 9/1999 | |
| EP | 2 543 743 A1 | | 1/2013 | |
| EP | 2543743 B1 | * | 11/2017 | ............... C21B 5/06 |
| JP | 54-150388 A | | 11/1979 | |
| JP | 2004-256314 A | | 9/2004 | |
| JP | 2005-144282 A | | 6/2005 | |
| JP | 2013-122084 A | | 6/2013 | |
| JP | 2013-237901 A | | 11/2013 | |
| JP | 2015-516361 A | | 6/2015 | |
| JP | 5796672 B2 | | 10/2015 | |
| JP | 2019-73411 A | | 5/2019 | |
| WO | WO 2011/108546 A1 | | 9/2011 | |

OTHER PUBLICATIONS

International Search Report for PCT/JP2021/013413 (PCT/ISA/210) mailed on Jun. 8, 2021.
Written Opinion of the International Searching Authority for PCT/JP2021/013413 (PCT/ISA/237) mailed on Jun. 8, 2021.
Chinese et al., "General Printing of Steel Production," Metallurgical Industry Press, 1st Edition, Sep. 30, 2017, 5 pages total.
Chinese Office Action and Search Report for Chinese Application No. 202180025150.6, dated Dec. 26, 2023, with English translation.

* cited by examiner

SOLID CARBON PRODUCTION DEVICE AND SOLID CARBON PRODUCTION METHOD

This application is a national stage application of International Patent Application No. PCT/JP2021/013413, now WO 2021/205935, filed on Mar. 29, 2021, that claims foreign priority to Japanese Patient Application No. JP2020-068427, filed on Apr. 6, 2020, the contents of which are incorporated herein by reference.

TECHNICAL FIELD

The present disclosure relates to a solid carbon production device and a solid carbon production method for producing a solid carbonaceous material from a carbon dioxide gas contained in a produced gas produced by a blast furnace.

BACKGROUND ART

Conventionally, as a method for substantially reducing the amount of produced carbon dioxide generated by a blast furnace that reduces iron ore to obtain molten pig iron, there is a known method for operating such a blast furnace to separate carbon dioxide from a mixture gas containing carbon dioxide generated by the blast furnace and add hydrogen to the separated carbon dioxide for conversion into methane (for example, see Patent Literature 1).

In Patent Literature 1, moisture is removed from a gas containing methane obtained by conversion from carbon dioxide, and the resulted methane from which moisture has been removed is blown into a blast furnace. Such removal of moisture from the gas obtained by conversion from carbon dioxide is performed because introduction of moisture to a blast furnace will cause coke in the blast furnace to be consumed, which will result in an increase in the amount of discharged carbon dioxide from the blast furnace. Methane blown into the blast furnace is converted into a reducing agent in the blast furnace, and the reducing agent is used for reduction of iron ore.

CITATION LIST

Patent Literature

[PTL 1] Japanese Patent No. 5796672

SUMMARY OF INVENTION

Technical Problem

In Patent Literature 1, since a gas containing methane obtained by conversion from carbon dioxide contains moisture, such moisture is required to be removed in order to prevent consumption of coke in a blast furnace. For example, when moisture is removed in a cooling system, this requires a cooling facility for cooling moisture contained in a gas to a temperature below a dew point temperature. Further, when moisture is removed in an adsorption system, this requires an adsorption facility inside which a dehumidifying adsorbent that adsorbs moisture contained in a gas is arranged. Accordingly, the method of adding hydrogen to carbon dioxide for conversion into methane results in a larger facility and requires motive power for operating the facility.

Further, methane obtained by conversion from carbon dioxide is a reducing agent that is of a different type from coke mainly used as a reducing agent for iron ore in a blast furnace. Thus, it is required to provide an additional facility that is different from a coke supply facility provided in a blast furnace and supply methane to the blast furnace.

The present disclosure has been made in view of such circumstances and intends to provide a solid carbon production device and a solid carbon production method that can produce solid carbon from a carbon dioxide gas by using a simple facility and supply solid carbon, which is a reducing agent, to a blast furnace by using an existing facility.

Solution to Problem

A solid carbon production device according to one aspect of the present disclosure includes: a separation unit configured to separate a carbon dioxide gas contained in a produced gas produced by a blast furnace; a reaction unit configured to heat a fuel gas whose main component is a methane gas by using a heating source and decompose the methane gas into solid carbon and a hydrogen gas; and a production unit configured to cause the carbon dioxide gas separated by the separation unit and the hydrogen gas decomposed by the reaction unit to react with each other to produce solid carbon and water.

A solid carbon production method according to one aspect of the present disclosure includes: a separation step of separating a carbon dioxide gas contained in a produced gas produced by a blast furnace; a reaction step of heating a fuel gas whose main component is a methane gas by using a heating source and decomposing the methane gas into solid carbon and a hydrogen gas; and a production step of causing the carbon dioxide gas separated by the separation step and the hydrogen gas decomposed by the reaction step to react with each other to produce solid carbon and water.

Advantageous Effects of Invention

According to the present disclosure, it is possible to provide a solid carbon production device and a solid carbon production method that can produce solid carbon from a carbon dioxide gas by using a simple facility and supply solid carbon, which is a reducing agent, to a blast furnace by using an existing facility.

DESCRIPTION OF EMBODIMENTS

First Embodiment

Figure 1:
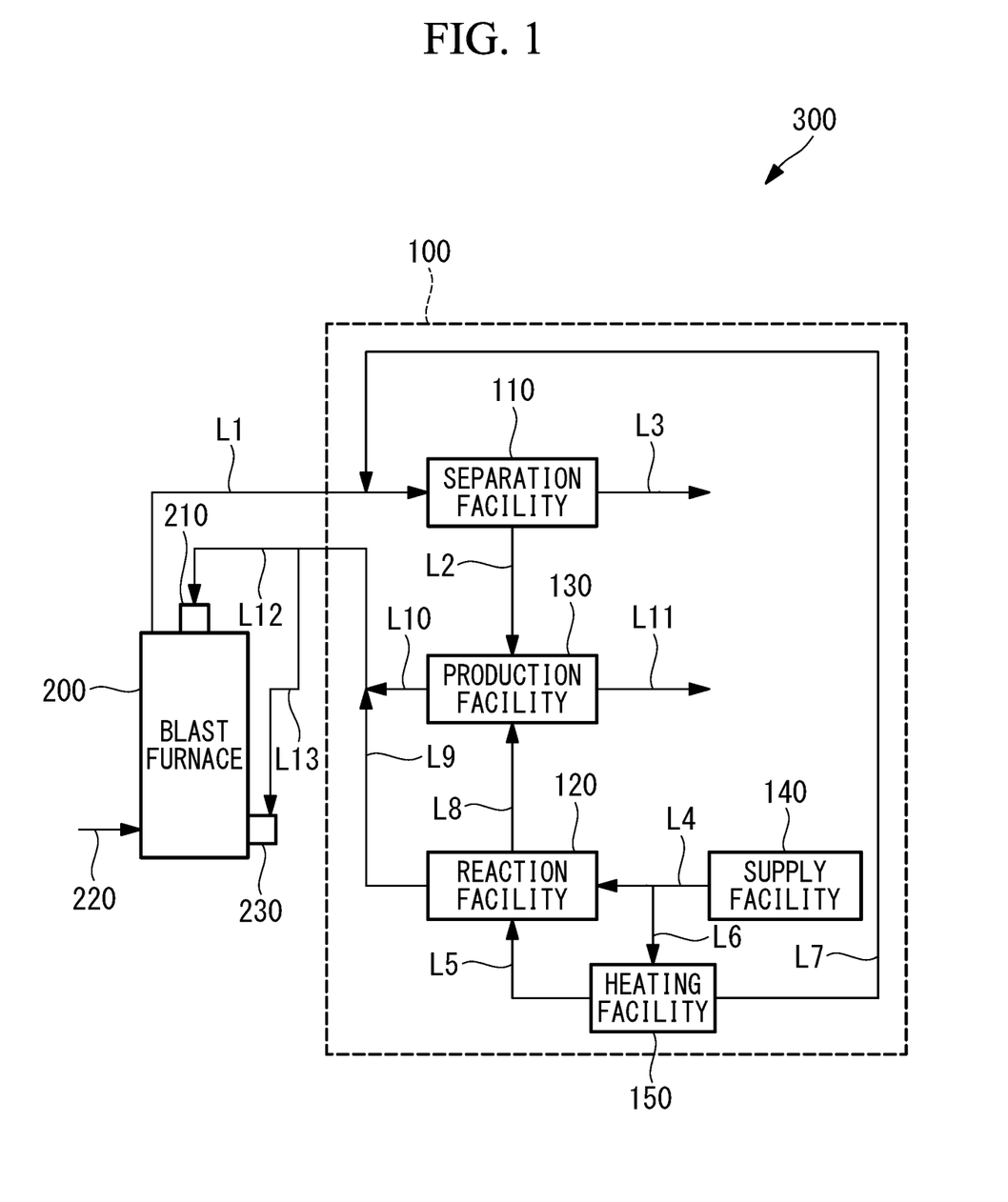
FIG. 1 is a schematic configuration diagram illustrating a blast furnace facility according to a first embodiment of the present disclosure.

A blast furnace facility 300 according to a first embodiment of the present disclosure will be described below with reference to drawings. FIG. 1 is a schematic configuration diagram illustrating the blast furnace facility 300 according to the first embodiment of the present disclosure.

As illustrated in FIG. 1, the blast furnace facility 300 of the present embodiment includes a solid carbon production facility (a solid carbon production device) 100 and a blast furnace 200.

The blast furnace 200 is a facility that causes iron ore to react with coke, which is a reducing agent, at a high temperature environment and reduces the iron ore to produce pig iron. The blast furnace 200 is supplied with iron ore and coke from a feedstock supply port 210 via a belt conveyer (not illustrated). The blast furnace 200 is supplied with hot blast via a pipe 220, and the inside thereof is maintained at a high temperature environment. Furthermore, a pulverized coal supply port 230 is provided to the blast furnace 200, and pulverized coal is blown therein via a pulverized coal supply mechanism (not illustrated).

In the blast furnace 200, coke is combusted, and thereby coke is oxidized into a carbon monoxide gas in accordance with the following reaction formula (1).

$$2C+O_2 \rightarrow 2CO \tag{1}$$

Further, iron ore is reduced by carbon monoxide into iron (pig iron) and a carbon dioxide gas in accordance with the following reaction formula (2).

$$Fe_2O_3+3CO \rightarrow 2Fe+3CO_2 \tag{2}$$

The solid carbon production facility 100 is a facility that separates a carbon dioxide gas contained in a produced gas produced by the blast furnace 200 and produces solid carbon from the carbon dioxide gas. As illustrated in FIG. 1, the solid carbon production facility 100 includes a separation facility (separation unit) 110, a reaction facility (reaction unit) 120, a production facility (production unit) 130, a supply facility (fuel gas supply unit) 140, and a heating facility (heating source) 150.

The separation facility 110 is a facility that separates a carbon dioxide gas contained in a produced gas produced in the blast furnace 200. The produced gas containing the carbon dioxide gas produced in the blast furnace 200 is guided from the blast furnace 200 to the separation facility 110 via a pipe L1. In the separation facility 110, for example, the carbon dioxide gas is absorbed in an absorption liquid containing amine, and thereby a carbon dioxide gas contained in a produced gas is separated (separation step).

The separation facility 110 absorbs a carbon dioxide gas in the absorption liquid, then heats the absorption liquid to release the carbon dioxide gas from the absorption liquid, and supplies a high concentration of a carbon dioxide gas to the production facility 130 via a pipe L2. The produced gas from which the carbon dioxide gas has been removed by the absorption liquid is discharged to outside of the blast furnace facility 300 via a pipe L3.

The reaction facility 120 uses the heating facility 150 to heat a fuel gas whose main component is a methane gas supplied from the supply facility 140 and decomposes the methane gas into solid carbon and a hydrogen gas in accordance with a thermal decomposition reaction expressed by the following reaction formula (3) (reaction step).

$$CH_4 \rightarrow 2H_2+C \tag{3}$$

The reaction facility 120 is supplied with a fuel gas from the supply facility 140 via a pipe L4. The fuel gas contains a methane gas as a main component and is a natural gas, for example. The reaction facility 120 is supplied with a heating medium heated by the heating facility 150 via a pipe L5. The reaction facility 120 is structured such that heat exchange can be performed without the heating medium being directly mixed with the fuel gas.

The reaction facility 120 supplies a hydrogen gas produced by thermal decomposition of a methane gas to the production facility 130 via a pipe L8. Further, the reaction facility 120 supplies solid carbon produced by the thermal decomposition of the methane gas to a pipe L9. The solid carbon supplied to the pipe L9 is supplied to a feedstock supply port 210 of the blast furnace 200 via a pipe L12.

The production facility 130 causes the carbon dioxide gas separated by the separation facility 110 and the hydrogen gas produced by the reaction facility 120 to react with each other in accordance with the following reaction formula (4) to produce solid carbon and water (production step).

$$CO_2+2H_2 \rightarrow C+2H_2O \tag{4}$$

The reaction expressed by reaction formula (4) occurs when a carbon dioxide gas and a hydrogen gas are contacted with a metal catalyst made up of nickel or cobalt at a reaction temperature of 400° C. to 900° C., for example.

Note that the gas supplied from the reaction facility 120 to the production facility 130 via the pipe L8 contains a residual methane gas undecomposed even after a thermal decomposition reaction. Thus, the production facility 130 causes the carbon dioxide gas separated by the separation facility 110 and the methane gas supplied from the reaction facility 120 to react with each other in accordance with the following reaction formula (5) to produce solid carbon and water.

$$CO_2+CH_4 \rightarrow 2C+2H_2O \tag{5}$$

The production facility 130 may include a heat supply mechanism (not illustrated) for using heat generated by the reactions of reaction formula (4) and reaction formula (5) as a heating source required for a thermal decomposition reaction in the reaction facility 120 or as another use for heating in the blast furnace facility 300.

In the production facility 130, for example, a metal catalyst is vibrated, and thereby powder solid carbon attached to the metal catalyst is dropped and collected. Alternatively, a liquid reaction field such as a liquid metal catalyst is used, fine bubbles of hydrogen, methane, or water vapor are attached to produced solid carbon, and the solid carbon with bubbles is floated in the liquid reaction field and collected. The production facility 130 supplies the collected solid carbon to a pipe L10. The solid carbon supplied to the pipe L10 is supplied to the feedstock supply port 210 of the blast furnace 200 via the pipe L12 equipped with a transport mechanism (not illustrated).

The pipe L12 is supplied with both the solid carbon transported from the reaction facility 120 via the pipe L9 and the solid carbon transported from the production facility 130 via the pipe L10. The pipe L12 is branched to a pipe L13. Thus, a part of the solid carbon supplied to the pipe L12 is supplied to the feedstock supply port 210 from the pipe L12, and the remaining part of the solid carbon supplied to the pipe L12 is supplied to a pulverized coal supply port 230 from the pipe L13. In such a way, the pipe L9, the pipe L10, the pipe L12, and the pipe L13 function as a solid carbon supply unit configured to supply solid carbon decomposed by the reaction facility 120 and solid carbon produced by the production facility 130 to the blast furnace 200.

In the reaction facility 120, since the fuel gas is already heated by the heating facility 150, a hydrogen gas produced by the reaction facility 120 is at a relatively high temperature (for example, 500° C. to 1200° C.). Water produced by the production facility 130 then becomes gas-phase water vapor in the high temperature environment. Thus, solid carbon that is solid in the production facility 130 can be separated from water vapor by a relatively simple facility that vibrates a metal catalyst. The production facility 130 discharges water vapor produced in accordance with reaction formula (5) to outside of the blast furnace facility 300 via the pipe L11.

The supply facility 140 supplies a fuel gas whose main component is a methane gas to the reaction facility 120 via the pipe L4. Further, the supply facility 140 supplies the fuel gas to the heating facility 150 via a pipe L6 branched from the pipe L4.

The heating facility 150 combusts a fuel gas supplied from the supply facility 140 and thereby heats the fuel gas supplied from the supply facility 140 to the reaction facility 120. The heating facility 150 combusts the fuel gas to heat a heating medium and supplies the heated heating medium to the reaction facility 120 via the pipe L5.

The combustion gas produced by combustion of the fuel gas by the heating facility 150 is supplied to the pipe L1 via a pipe (combustion gas supply unit) L7. The combustion gas supplied to the pipe L1 is supplied to the separation facility 110. In such a way, the pipe L7 and the pipe L1 function as a combustion gas supply unit configured to supply a combustion gas to the separation facility 110. Since the combustion gas contains a carbon dioxide gas, it is possible to supply the carbon dioxide gas contained in the combustion gas to the production facility 130 by supplying the combustion gas to the separation facility 110.

Note that, although a combustion gas produced by the heating facility 150 is supplied to the separation facility 110 in the present embodiment, other forms may be employed. For example, the combustion gas may be discharged to outside of the blast furnace facility 300 via the pipe L7 without connecting the pipe L7 to the pipe L1.

Note that, although a part of solid carbon is supplied from the pipe L12 to the feedstock supply port 210 in the present embodiment, other forms may be employed. For example, the whole amount of solid carbon may be supplied to the pulverized coal supply port 230 only via the pipe L13 without connecting the pipe L12 between the pipe L10 and the feedstock supply port 210. This can minimize an operation change in an existing facility when solid carbon is produced in a form of fine powders similar to pulverized coal.

Effects and advantages achieved by the solid carbon production facility 100 of the present embodiment described above will be described.

According to the solid carbon production facility 100 of the present disclosure, a carbon dioxide gas separated by the separation facility 110 and a hydrogen gas decomposed by the reaction facility 120 react with each other in the production facility 130, and solid carbon and water are produced. In the reaction facility 120, since a fuel gas whose main component is a methane gas is already heated by the heating facility 150, the hydrogen gas produced by the reaction facility 120 is at a relatively high temperature. Since water produced by the production facility 130 then becomes gas-phase water vapor in the high temperature environment, solid carbon that is solid in the production facility 130 can be separated from water vapor by a relatively simple facility.

Further, according to the solid carbon production facility 100 of the present embodiment, the solid carbon produced by the production facility 130 is the same as the main component of coke used mainly as a reducing agent for iron ore in the blast furnace 200. It is thus possible to supply solid carbon, which is a reducing agent, to the blast furnace 200 by using the feedstock supply port 210 that is an existing facility for supplying coke to the blast furnace 200 as a reducing agent for iron ore.

Further, according to the solid carbon production facility 100 of the present embodiment, a fuel gas is supplied from the supply facility 140 to both the reaction facility 120 and the heating facility 150. Thus, since the fuel gas whose main component is a methane gas is already heated by the heating facility 150 in the reaction facility 120, it is not required to provide an additional supply facility for supplying fuel that is different from the fuel gas or an additional heating unit for heating the fuel in the heating facility 150.

Further, according to the solid carbon production facility 100 of the present embodiment, a combustion gas produced by combustion of a fuel gas by the heating facility 150 is supplied to the separation facility 110 through the pipe L7 and the pipe L1. It is thus possible to separate a carbon dioxide gas contained in the combustion gas at the separation facility 110 and produce solid carbon at the production facility 130 without discharging the carbon dioxide gas contained in the combustion gas to outside of the blast furnace facility 300.

Further, according to the solid carbon production facility 100 of the present embodiment, without requiring an operator to perform carrying work or the like, it is possible to supply both the solid carbon decomposed by the reaction facility 120 and the solid carbon produced by the production facility 130 to the blast furnace 200 by using the pipe L9, the pipe L10, the pipe L12, and the pipe L13 that function as a solid carbon supply line.

Second Embodiment

Figure 2:
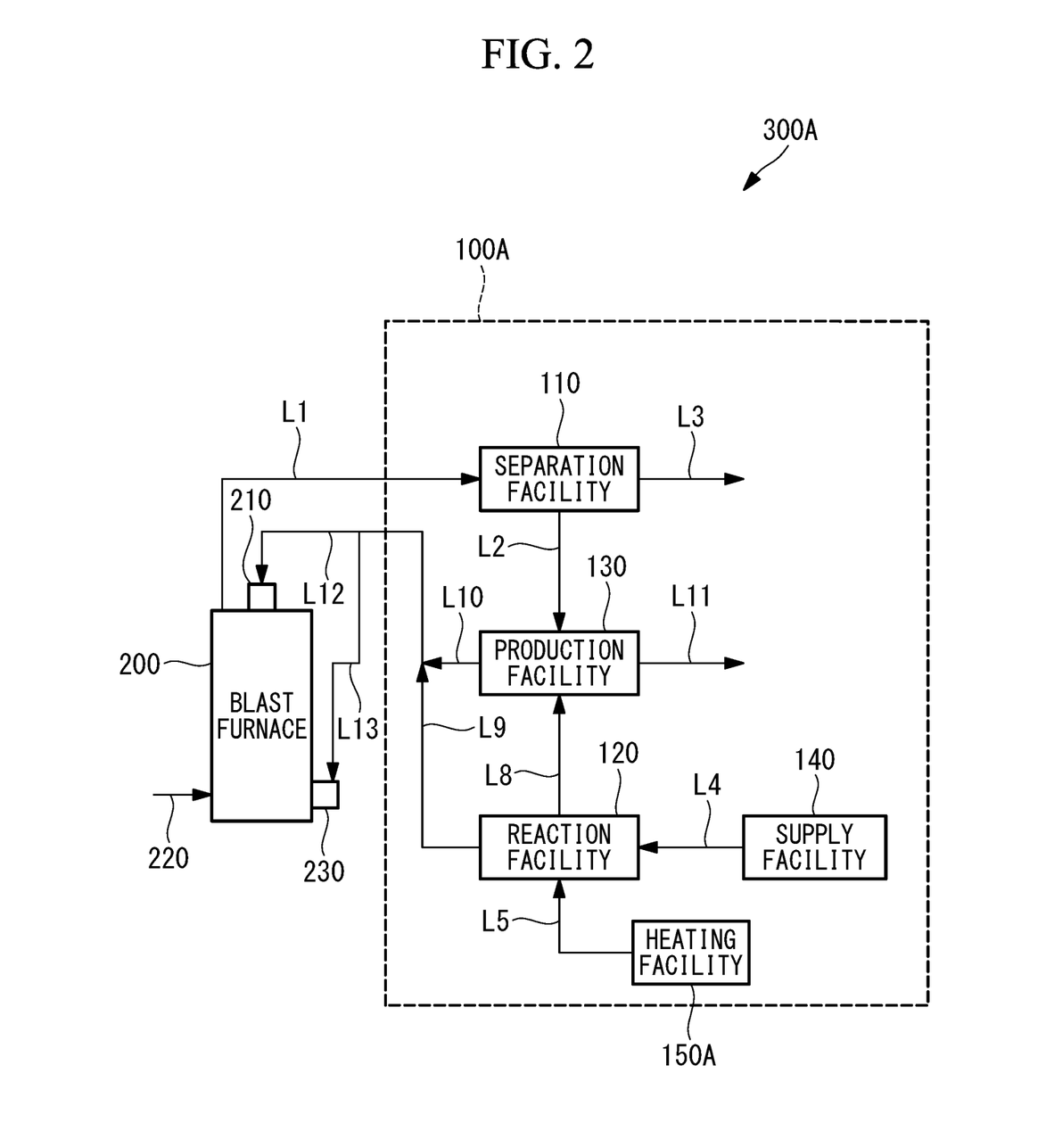
FIG. 2 is a schematic configuration diagram illustrating a blast furnace facility according to a second embodiment of the present disclosure.

Next, a second embodiment of the present disclosure will be described with reference to the drawings. FIG. 2 is a schematic configuration diagram illustrating a blast furnace facility 300A according to the second embodiment of the present disclosure. The present embodiment is a modified example of the first embodiment, and except for a case where specific description is provided below, the description will be omitted below as being the same as that in the first embodiment.

The solid carbon production facility 100 of the first embodiment is a facility including the heating facility 150 that heats a heating medium by combusting a fuel gas whose main component is a methane gas supplied from the supply facility 140. In contrast, a solid carbon production facility 100A of the present embodiment is a facility including a heating facility 150A that heats a heating medium by converting electric power into heat without being supplied with a fuel gas from the supply facility 140.

As illustrated in FIG. 2, the solid carbon production facility 100A of the present embodiment differs from the solid carbon production facility 100 of the first embodiment in that it includes neither the pipe L6 nor the pipe L7. The pipe L6 is not provided to the solid carbon production facility 100A of the present embodiment, because the heating facility 150A heats a heating medium without using a fuel gas stored by the supply facility 140. Further, the pipe L7 is not provided to the solid carbon production facility 100A of the present embodiment, because the heating facility 150A heats a heating medium without using a fuel gas and thus produces no combustion gas.

The heating facility 150A of the present embodiment is a facility that heats a heating medium by converting electric power into heat and supplies the heating medium to the pipe L5. The heating medium supplied to the pipe L5 is used as a heat source for performing a thermal decomposition reaction on a fuel gas in the reaction facility 120. Various schemes can be employed as a scheme for the heating facility 150A to convert electric power into heat.

The heating facility 150A may be a facility that heats a heating medium via a resistor by conducting current in the resistor, for example. Further, for example, other heating schemes such as induction heating, dielectric heating, arc heating, infrared heating, or the like may be used to heat the heating medium.

According to the solid carbon production facility 100A of the present embodiment, since it is possible to heat a fuel gas by using electric power without involving a combustion reaction, it is possible to suppress the amount of the discharged carbon dioxide gas produced due to the combustion reaction.

Third Embodiment

Figure 3:
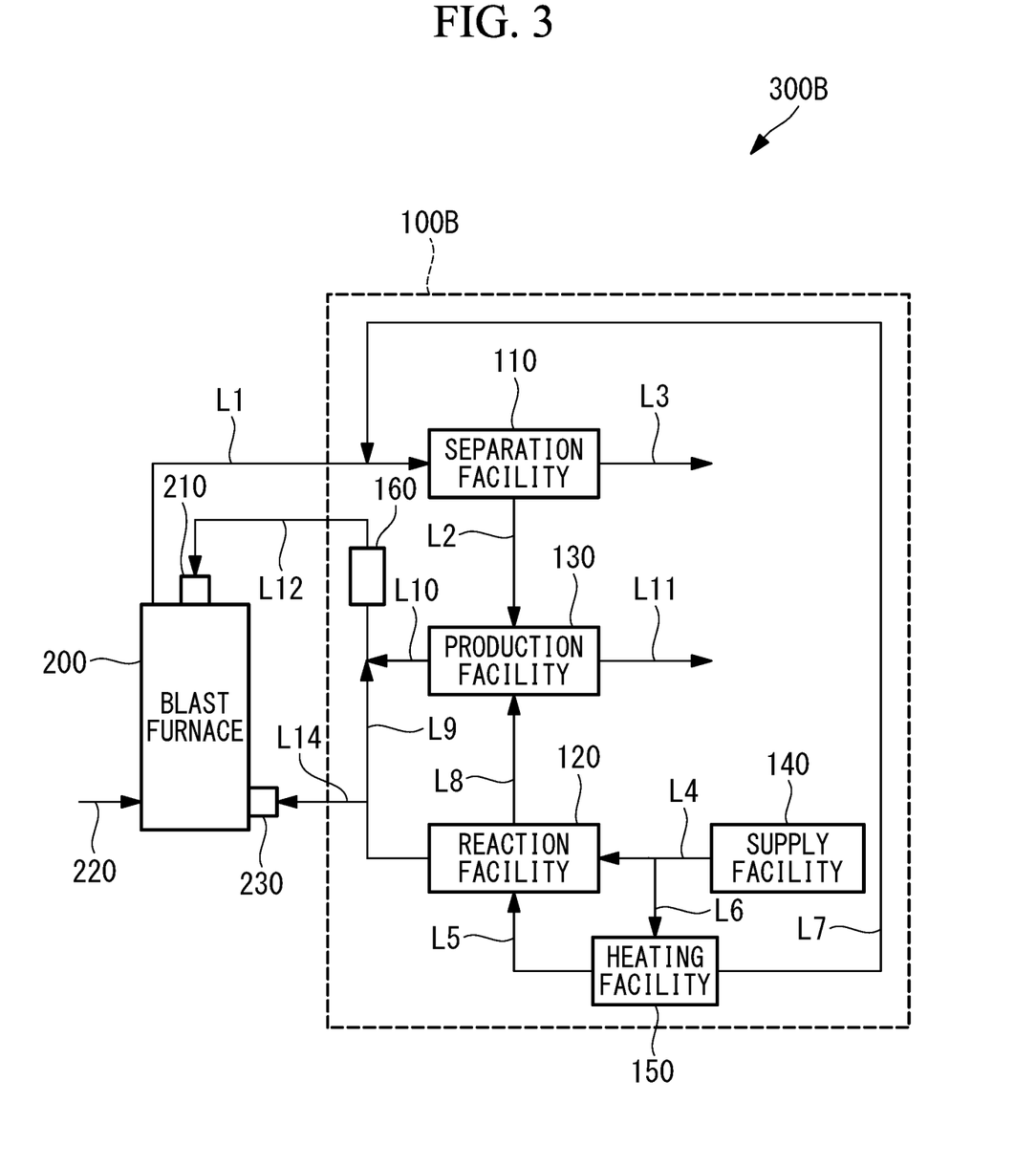
FIG. 3 is a schematic configuration diagram illustrating a blast furnace facility according to a third embodiment of the present disclosure.

Next, a third embodiment of the present disclosure will be described with reference to the drawings. FIG. 3 is a schematic configuration diagram illustrating a blast furnace facility 300B according to the third embodiment of the present disclosure. The present embodiment is a modified example of the first embodiment, and except for a case where specific description is provided below, the description will be omitted below as being the same as that in the first embodiment. The blast furnace facility 300B of the present embodiment differs from the blast furnace facility 300 of the first embodiment in that the solid carbon production facility 100B includes a pellet molding facility (solid molding unit) 160.

As illustrated in FIG. 3, the solid carbon production facility 100B of the present embodiment differs from the solid carbon production facility 100 of the first embodiment in that the pipe L13 is not provided. Further, the solid carbon production facility 100B of the present embodiment differs from the solid carbon production facility 100 of the first embodiment in that a pipe L14 is provided.

Because granular pellets are produced from solid carbon by the pellet molding facility 160, the pipe L13 of the solid carbon production facility 100 of the first embodiment is not provided to the solid carbon production facility 100B of the present embodiment in order to prevent granular pellets from being guided to the pulverized coal supply port 230. Further, the pipe L14 is provided to the solid carbon production facility 100B of the present embodiment in order to guide powder solid carbon to the pulverized coal supply port 230.

The solid carbon production facility 100B of the present embodiment supplies granular pellets to the feedstock supply port 210 and supplies powder solid carbon to the pulverized coal supply port 230. According to the solid carbon production facility 100B of the present embodiment, it is possible to supply solid carbon to the blast furnace 200 from a suitable supply port in accordance with characteristics of the solid carbon and thus increase the efficiency of a reduction reaction of iron ore in the blast furnace 200.

The pellet molding facility 160 is provided to the pipe L12 and is a facility that mixes powder solid carbon with a binder to produce granular pellets (granular solid carbonaceous material) and supplies the granular pellets to the blast furnace 200. As the binder mixed with solid carbon by the pellet molding facility 160, for example, a pitch product or a resin product can be preferably used. The pitch product may be, for example, asphalt pitch, soft oil pitch, or the like. The resin product may be, for example, polyester resin, polyolefin resin, polyurethane resin, rosin, phenol resin, or the like.

The pellet molding facility 160 mixes solid carbon with a binder, applies molding treatment and baking treatment thereto, and produces granular pellets having a higher strength than powder solid carbon. Note that the pellet molding facility 160 may mix not only solid carbon but also iron ore powder with a binder. According to the solid carbon production facility 100B of the present embodiment, solid carbon can be supplied to the blast furnace 200 as pellets mixed with a binder (granular solid carbonaceous material). Thus, the strength of solid carbon supplied to the blast furnace 200 increases, and iron ore can be efficiently reduced.

The solid carbon production device (100) described in each embodiment illustrated above is recognized as follows, for example.

The solid carbon production device (100) according to the present disclosure includes: a separation unit (110) configured to separate a carbon dioxide gas contained in a produced gas produced by a blast furnace (200); a reaction unit (120) configured to heat a fuel gas whose main component is a methane gas by using a heating source (150) and decompose the methane gas into solid carbon and a hydrogen gas; and a production unit (130) configured to cause the carbon dioxide gas separated by the separation unit and the hydrogen gas decomposed by the reaction unit to react with each other to produce solid carbon and water.

According to the solid carbon production device of the present disclosure, the carbon dioxide gas separated by the separation unit and the hydrogen gas decomposed by the reaction unit react with each other in the production unit, and solid carbon and water are produced. Since a fuel gas whose main component is a methane gas is already heated by a heating source in the reaction unit, the hydrogen gas produced by the reaction unit is a relatively high temperature. Since the water produced in the production unit then becomes gas-phase water vapor in the high temperature environment, solid carbon that is solid in the production unit can be separated from water vapor by a relatively simple facility.

According to the solid carbon production device of the present disclosure, the solid carbon produced by the production unit is the same as the main component of coke used mainly as a reducing agent for iron ore in the blast furnace. It is thus possible to supply solid carbon, which is a reducing agent, to the blast furnace by using an existing facility for supplying coke to the blast furnace as a reducing agent for iron ore.

It is preferable to configure the solid carbon production device according to the present disclosure to include a fuel gas supply unit (140) configured to supply the fuel gas to the reaction unit and the heating source, in which the heating source may heat the fuel gas supplied from the fuel gas supply unit to the reaction unit by combusting the fuel gas supplied from the fuel gas supply unit.

According to the solid carbon production device of the present configuration, a fuel gas is supplied from the fuel gas supply unit to both the reaction unit and the heating source. Thus, it is not required to provide an additional supply facility for supplying fuel that is different from the fuel gas or an additional heating unit for heating the fuel in the heating source in order to heat the fuel gas whose main component is a methane gas in the reaction unit by using the heating source.

It is preferable to configure the solid carbon production device according to the above configuration to include a combustion gas supply unit configured to supply the separation unit with a combustion gas produced by combusting the fuel gas by using the heating source.

According to the solid carbon production device of the present configuration, a combustion gas produced by combustion of a fuel gas by the heating source is supplied to the separation unit through combustion gas supply unit. It is thus possible to separate a carbon dioxide gas contained in the combustion gas at the separation unit and produce solid carbon at the production unit without externally discharging the carbon dioxide gas contained in the combustion gas.

It is preferable to configure the solid carbon production device according to the above configuration so that the heating source converts electric power into heat to heat the fuel gas.

According to the solid carbon production device of the present configuration, since it is possible to heat a fuel gas by using electric power without involving a combustion reaction, it is possible to suppress the amount of the discharged carbon dioxide gas produced due to the combustion reaction.

It is preferable to configure the solid carbon production device according to the present embodiment to include a solid carbon supply line (L9, L10, L12, L13) configured to supply the blast furnace with solid carbon decomposed by the reaction unit and solid carbon produced by the production unit.

According to the solid carbon production device of the present configuration, without requiring an operator to perform carrying work or the like, it is possible to supply both the solid carbon decomposed by the reaction unit and the solid carbon produced by the production unit to the blast furnace by using the solid carbon supply line.

It is preferable to form the solid carbon production device of the above configuration so that the solid carbon supply line is configured to supply solid carbon decomposed by the reaction unit and solid carbon produced by the production unit to both a feedstock supply port from which iron ore and coke are supplied to the blast furnace and a pulverized coal supply port from which pulverized coal is supplied to the blast furnace.

According to the solid carbon production device of the present form, the solid carbon decomposed by the reaction unit and the solid carbon produced by the production unit can be supplied for assisting both coke supplied from the feedstock supply port and pulverized coal supplied from the pulverized coal supply port.

It is preferable to form the solid carbon production device of the above configuration so that the solid carbon supply line is configured to supply the whole amount of solid carbon decomposed by the reaction unit and solid carbon produced by the production unit to a pulverized coal supply port from which pulverized coal is supplied to the blast furnace.

According to the solid carbon production device of the present form, the whole amount of the solid carbon decomposed by the reaction unit and the solid carbon produced by the production unit can be supplied for assisting pulverized coal supplied from the pulverized coal supply port.

It is preferable to configure the solid carbon production device according to the present embodiment to include a solid molding unit (160) provided to the solid carbon supply line and configured to mix solid carbon decomposed by the reaction unit and solid carbon produced by the production unit with a binder to mold a granular solid carbonaceous material.

According to the solid carbon production device of the present configuration, solid carbon can be supplied to the blast furnace as a granular solid carbonaceous material mixed with a binder. Thus, the strength of solid carbon supplied to the blast furnace increases, and iron ore can be efficiently reduced.

The solid carbon production method described in each embodiment illustrated above is recognized as follows, for example.

The solid carbon production method according to the present disclosure includes: a separation step of separating a carbon dioxide gas contained in a produced gas produced by a blast furnace; a reaction step of heating a fuel gas whose main component is a methane gas by using a heating source and decomposing the methane gas into solid carbon and a hydrogen gas; and a production step of causing the carbon dioxide gas separated by the separation step and the hydrogen gas decomposed by the reaction step to react with each other to produce solid carbon and water.

According to the solid carbon production method of the present disclosure, the carbon dioxide gas separated by the separation step and the hydrogen gas decomposed by the reaction step react with each other in the production step, and solid carbon and water are produced. Since a fuel gas whose main component is methane is already heated by a heating source in the reaction step, the hydrogen gas produced by the reaction step is a relatively high temperature. Since the water produced in the production step then becomes gas-phase water vapor in the high temperature environment, solid carbon that is solid in the production step can be separated from water vapor by a relatively simple facility.

According to the solid carbon production method of the present disclosure, the solid carbon produced by the production step is the same as the main component of coke used mainly as a reducing agent for iron ore in the blast furnace. It is thus possible to supply solid carbon, which is a reducing agent, to the blast furnace by using an existing facility to supply coke to the blast furnace as a reducing agent for iron ore.

The present international patent application claims priority based on Japanese Patent Application No. 2020-68427 filed at Japan Patent Office on Apr. 6, 2020, and the entire content of Japanese Patent Application No. 2020-68427 is incorporated in the present international patent application.

REFERENCE SIGNS LIST 100, 100A, 100B solid carbon production facility
110 separation facility (separation unit)
120 reaction facility (reaction unit)
130 production facility (production unit)
140 supply facility (fuel gas supply unit)
150, 150A heating facility (heating source)
160 pellet molding facility (solid molding unit)
200 blast furnace
210 feedstock supply port
220 pipe
230 pulverized coal supply port
300, 300A, 300B blast furnace facility

The invention claimed is:

1. A solid carbon production device comprising:
a separation unit configured to separate a carbon dioxide gas contained in a produced gas produced by a blast furnace;
a reaction unit configured to heat a fuel gas whose main component is a methane gas by using a heating source and decompose the methane gas into solid carbon and a hydrogen gas; and a production unit configured to cause the carbon dioxide gas separated by the separation unit and the hydrogen gas decomposed by the reaction unit to react with each other to produce solid carbon and water.

2. The solid carbon production device according to claim 1 further comprising a fuel gas supply unit configured to supply the fuel gas to the reaction unit and the heating source, wherein the heating source is configured to heat the fuel gas supplied from the fuel gas supply unit to the reaction unit by combusting the fuel gas supplied from the fuel gas supply unit.

3. The solid carbon production device according to claim 2 further comprising a combustion gas supply unit configured to supply the separation unit with a combustion gas produced by combusting the fuel gas by using the heating source.

4. The solid carbon production device according to claim 1, wherein the heating source converts electric power into heat to heat the fuel gas.

5. The solid carbon production device according to claim 1 further comprising a solid carbon supply line configured to supply the blast furnace with solid carbon decomposed by the reaction unit and solid carbon produced by the production unit.

6. The solid carbon production device according to claim 5, wherein the solid carbon supply line is configured to supply solid carbon decomposed by the reaction unit and solid carbon produced by the production unit to both a feedstock supply port from which iron ore and coke are supplied to the blast furnace and a pulverized coal supply port from which pulverized coal is supplied to the blast furnace.

7. The solid carbon production device according to claim 5, wherein the solid carbon supply line is configured to supply the whole amount of solid carbon decomposed by the reaction unit and solid carbon produced by the production unit to a pulverized coal supply port from which pulverized coal is supplied to the blast furnace.

8. The solid carbon production device according to claim 5 further comprising a solid molding unit provided to the solid carbon supply line and configured to mix solid carbon decomposed by the reaction unit and solid carbon produced by the production unit with a binder to mold a granular solid carbonaceous material.

9. A solid carbon production method comprising:

a separation step of separating a carbon dioxide gas contained in a produced gas produced by a blast furnace;

a reaction step of heating a fuel gas whose main component is a methane gas by using a heating source and decomposing the methane gas into solid carbon and a hydrogen gas; and a production step of causing the carbon dioxide gas separated by the separation step and the hydrogen gas decomposed by the reaction step to react with each other to produce solid carbon and water.

* * * * *